United States Patent [19]

Sato et al.

[11] Patent Number: 5,016,834
[45] Date of Patent: May 21, 1991

[54] ADAPTOR FOR A SMALL-SIZED TAPE CASSETTE

[75] Inventors: Seizi Sato, Kanagawa; Eiji Yano, Tokyo, both of Japan

[73] Assignee: Sony Corporation, Tokyo, Japan

[21] Appl. No.: 429,170

[22] Filed: Oct. 30, 1989

[30] Foreign Application Priority Data

Nov. 25, 1988 [JP] Japan .................................. 63-297837

[51] Int. Cl.$^5$ .............................................. G11B 23/04
[52] U.S. Cl. ......................................... 242/199; 360/92
[58] Field of Search ............... 242/197, 198, 199, 200; 360/90, 91, 92, 94, 96.6; 206/387

[56] References Cited

U.S. PATENT DOCUMENTS

| | | | |
|---|---|---|---|
| 4,432,510 | 2/1984 | Ogata et al. | 242/200 |
| 4,452,407 | 6/1984 | Ogata et al. | 242/199 X |
| 4,479,618 | 10/1984 | Okado et al. | 242/200 |
| 4,554,603 | 11/1985 | Tsuchiya | 242/199 X |
| 4,566,048 | 1/1986 | Tokunaga et al. | 242/200 X |
| 4,567,536 | 1/1986 | Tsuchiya | 242/199 X |
| 4,622,605 | 11/1986 | Tsuruoka et al. | 242/199 X |

FOREIGN PATENT DOCUMENTS 58-185072 10/1983 Japan .

Primary Examiner—Daniel P. Stodola
Assistant Examiner—William G. Battista, Jr.
Attorney, Agent, or Firm—Philip M. Shaw, Jr.

[57] ABSTRACT

A small-sized tape cassette adaptor system in which a small-sized tape cassette is accommodated in an adaptor whose size is the same as that of a standardized tape cassette so that the small-sized tape cassette may be loaded into a recording and/or reproducing apparatus utilizing the standardized tape cassette. Tape withdrawing levers are provided within the small-sized tape cassette for withdrawing a magnetic tape, and a rotating member is mounted within the adaptor in a position for rotating the tape withdrawing levers, so that the tape withdrawing levers are rotated by the rotating member upon insertion of the small-sized tape cassette into the adaptor.

21 Claims, 6 Drawing Sheets

ADAPTOR FOR A SMALL-SIZED TAPE CASSETTE

BACKGROUND OF THE INVENTION

1. Field of the Invention

The present invention relates generally to adaptors for a tape cassette and, more particularly, is directed to an adaptor for making a small-sized tape cassette compatible with a standardized tape cassette so that the small-sized tape cassette can be loaded onto a recording and/or reproducing apparatus for the standardized tape cassette.

2. Description of the Prior Art

It is preferred that electronic equipment such as portable-type video tape recorders and video cameras used outdoors should be made light-weight and compact in size. With respect to recording and/or reproducing apparatus utilizing a tape cassette as a record medium, the standardization of the tape cassette necessarily restricts the sizes of the video tape recorder and the video camera. To solve this problem, it has been proposed to make a tape cassette smaller than a standardized tape cassette. This type of small tape cassette is disclosed, for example, in Japanese Laid-open Patent Application No. 58-185072 and the like. A small-sized tape cassette utilizes an adaptor so that it can be made compatible with a standardized tape cassette. Thus, when a conventional small-sized tape cassette is reproduced by, for example, a floor-type video tape recorder, the small-sized tape cassette is accommodated within the adaptor and is then loaded on the video tape recorder.

A prior-art adaptor for a conventional small-sized tape cassette utilizes a motor to move a magnetic tape incorporated within the small-sized tape cassette so that the magnetic tape is extended within the adaptor. This motor and a battery for the motor increase the weight of the adaptor, and they also make the adaptor very expensive from the standpoints of function and monetary cost. Further, the prior-art adaptor utilizing the motor and battery cannot be driven when the battery is dead, and the drive speed of the adaptor is low. Furthermore, the motor and the battery make it very difficult to miniaturize the adaptor.

OBJECTS AND SUMMARY OF THE INVENTION

Accordingly, it is a general object of the present invention to provide an improved adaptor for a small-sized tape cassette in which the above-noted defects encountered with the prior art are eliminated.

More specifically, it is an object of the present invention to provide an adaptor for a small-sized tape cassette in which a magnetic tape, incorporated within the small-sized tape cassette, can be withdrawn without utilizing a motor and a battery when the small-sized tape cassette is inserted into the adaptor.

It is another object of the present invention to provide an adaptor for a small-sized tape cassette in which the weight can be reduced and the overall arrangement can be miniaturized.

It is still another object of the present invention to provide an adaptor for a small-sized tape cassette in which the manufacturing cost can be reduced considerably.

It is still another object of the present invention to provide an adaptor for a small-sized tape cassette which can be utilized in a wide variety of places.

It is still another object of the present invention to provide an adaptor for a small-sized tape cassette in which the adaptor can be readily loaded on and/or ejected from a recording and/or reproducing apparatus.

According to an aspect of the present invention, there is provided a tape cassette adaptor system in which a small-sized tape cassette smaller than a standardized tape cassette is accommodated in an adaptor whose size is the same as that of the standardized tape cassette, for enabling the small-sized tape cassette to be loaded onto a recording and/or reproducing apparatus utilizing the standardized tape cassette, wherein the small-sized tape cassette houses a magnetic tape, and comprising:

(a) tape withdrawing levers within the small-sized tape cassette for withdrawing the magnetic tape; and (b) a rotating means mounted within the adaptor for rotating the tape withdrawing levers, wherein the rotating means is mounted in such a position that the tape withdrawing levers are rotated by said rotating means upon insertion of the small-sized tape cassette into the adaptor.

These and other objects, features and advantages of the present invention will be apparent in the following detailed description of a preferred embodiment of the invention when read in conjunction with the accompanying drawings, in which like reference numerals are used to identify the same or similar parts in the several views.

BRIEF DESCRIPTION OF THE DRAWINGS

The accompanying drawings show a preferred embodiment of the invention in which.

DETAILED DESCRIPTION OF A PREFERRED EMBODIMENT

A small-sized tape cassette adaptor system according to an embodiment of the present invention will now be described with reference to the drawings.

Figure 1:
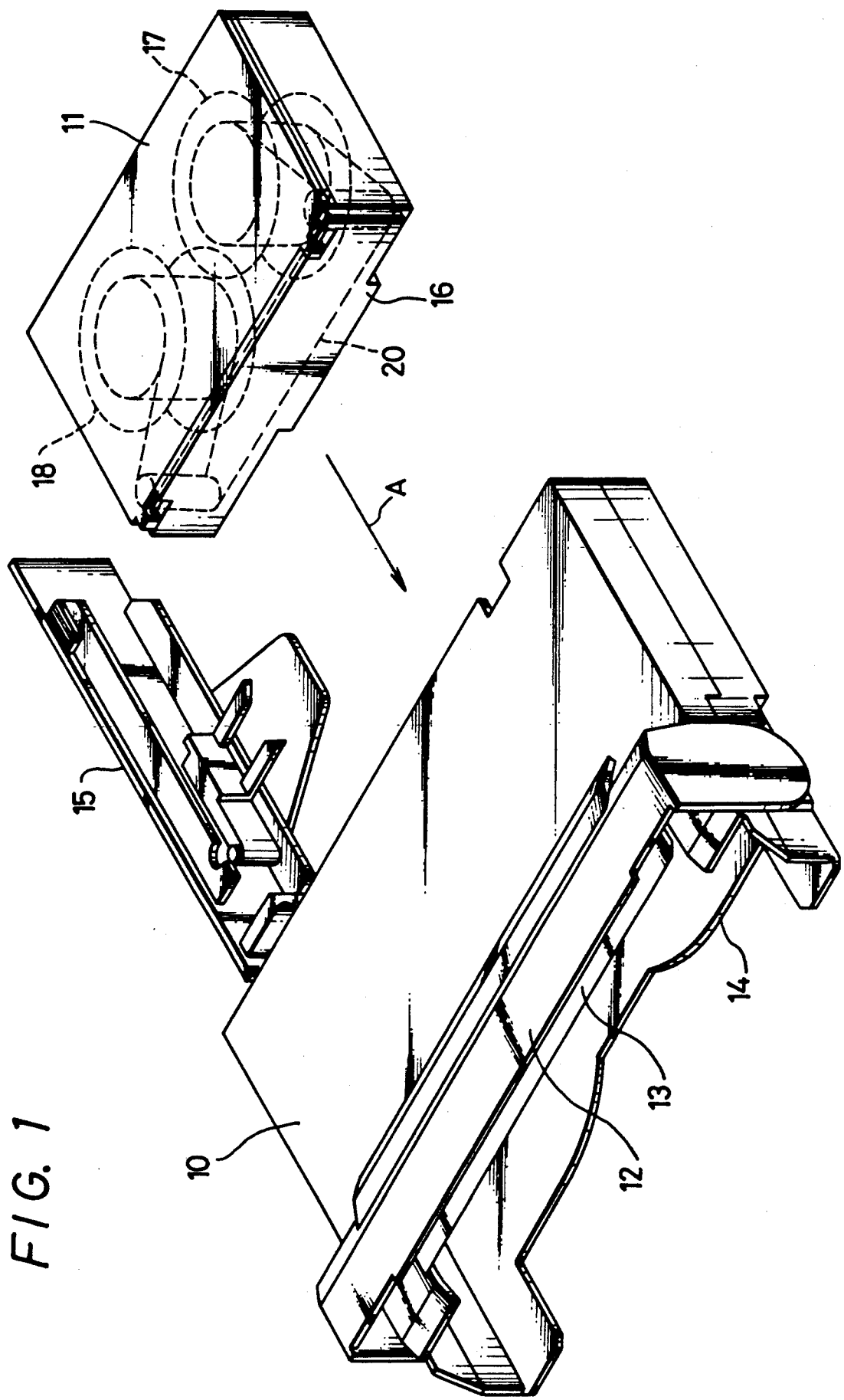
FIG. 1 is a perspective view of an adaptor according to the present invention and a small-sized tape cassette, to which reference will be made in explaining the insertion operation in which the small-sized tape cassette is inserted into the adaptor.

Referring to the drawings, and initially to FIG. 1, there is provided an adaptor 10 for a tape cassette. The size of adaptor 10 is the same as that of a tape cassette according to the predetermined standard. Adaptor 10 enables a small-sized tape cassette 11 to have compatibility with a standardized tape cassette.

The adaptor 10 is provided with a front lid 12, and an auxiliary lid 13 inside front lid 12. Lids 12 and 13 are arranged to cover the front side of a bottom opening 14 of the adaptor 10. Adaptor 10 is also provided with a rear lid 15. When rear lid 15 is opened, the small-sized tape cassette 11 can be inserted into the adaptor 10. The small-sized tape cassette 11 is provided with a front lid 16, and a magnetic tape 20 wound around a pair of reel hubs 17 and 18 is extended inside of the front lid 16.

A lock mechanism for locking front lid 12 of adaptor 10 will be explained with reference to FIGS. 2 through 4.

Figure 2:
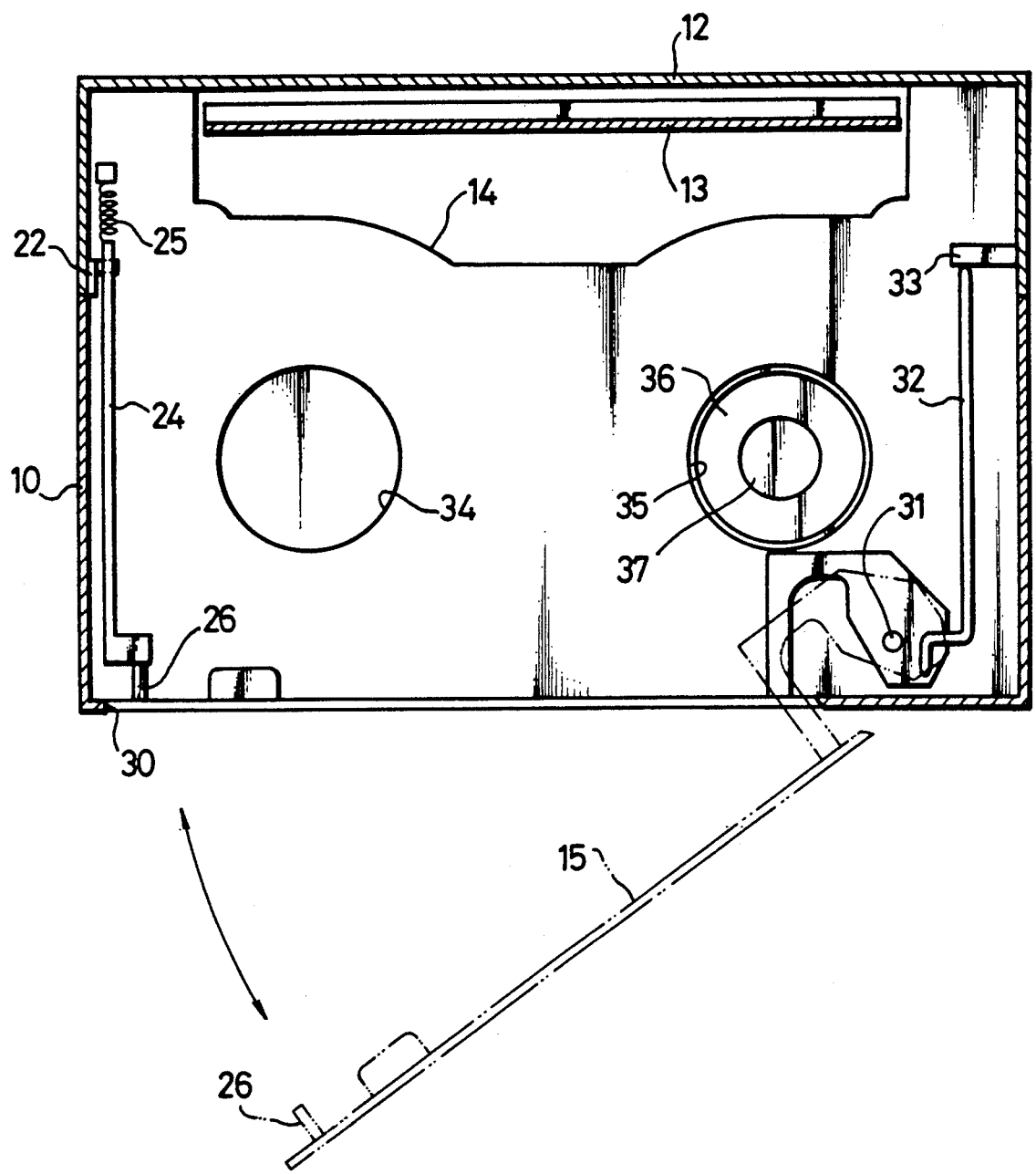
FIG. 2 is a planar cross-sectional view illustrating the internal structure of a main component of the adaptor of FIG. 1, to which reference will be made in explaining the operations of opening and/or closing its rear lid.
Figure 3:
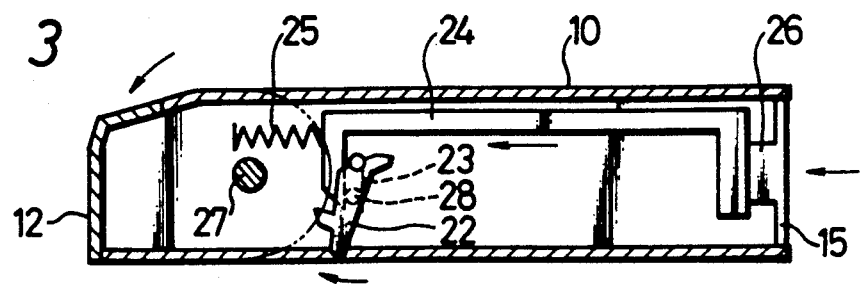
FIG. 3 is a schematic side view of the adaptor, to which reference will be made in explaining the lock-releasing operation of its front lid.
Figure 4:
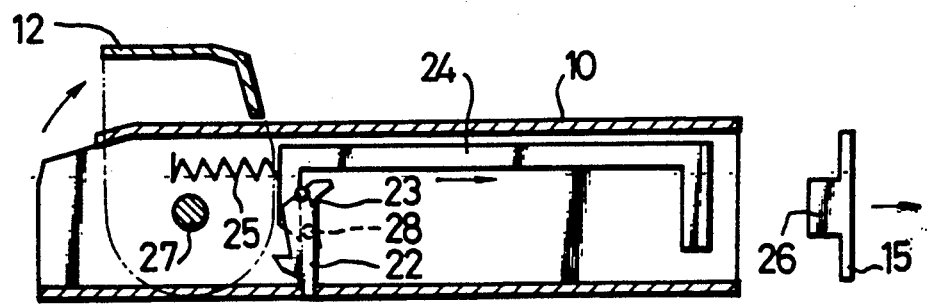
FIG. 4 is a schematic side view of the adaptor, with its front lid fully opened.

The front lid 12 of adaptor 10 is locked by a lock lever 22 shown in FIGS. 2 through 4. Lock lever 22 is spring-biased by a coil spring 23 so as to rotate into a locking position (shown in FIG. 3). A releasing slider 24 for lock lever 22 is provided inside of the adaptor 10 and is slidably moved along the inner side wall of adaptor 10. The slider 24 is spring-biased toward the rear (in the direction of the arrow shown in FIG. 4) by a compression coil spring 25. Rear lid 15 of adaptor 10 has a protrusion 26. When protrusion 26 withdraws toward the right, slider 24 pushes pin 28 of lock lever 22 against the spring force of coil spring 23, in order to release front lid 12 so that front lid 12 will rotate around supporting shaft 27 into the open position shown in FIG. 4.

Figure 5:
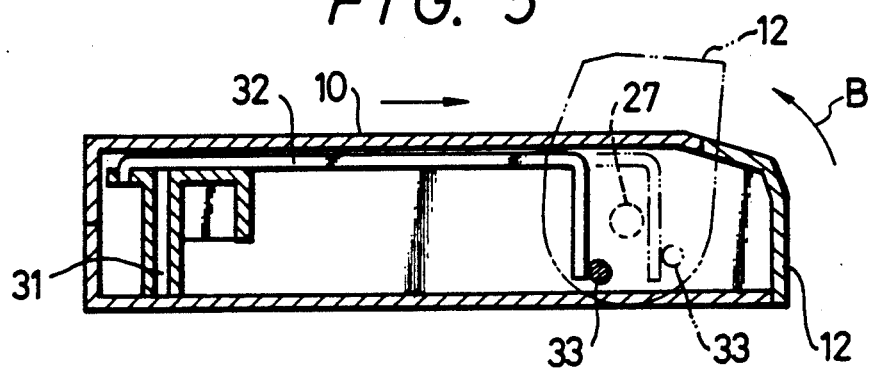
FIG. 5 is a schematic side view of the adaptor seen from the opposite direction as in FIG. 4, to which reference will be made in explaining the operation of opening its front lid.

As shown in FIG. 2, rear lid 15 of adaptor 10 is rotatably supported by a supporting pin 31 so as to open and/or close a rear opening 30 of adaptor 10. The base end side of rear lid 15 is coupled to a link 32, and a top portion of link 32 pushes pin 33 implanted on the side wall of front lid 12 as shown in FIG. 5.

As shown in FIG. 2, a pair of circular openings 34 and 35 are formed through the bottom wall of adaptor 10, and a drive gear 36 is rotatably mounted within opening 35. A boss 37 of drive gear 36 has formed on its under surface a concave portion (not shown in FIG. 2). This concave portion is adapted to receive one reel shaft of a video tape recorder (not shown in FIG. 2). The other reel shaft of the video tape recorder is directly projected into the adaptor 10 through circular opening 34.

The construction of small-sized tape cassette 11 will be described with reference to FIG. 6.

Figure 6:
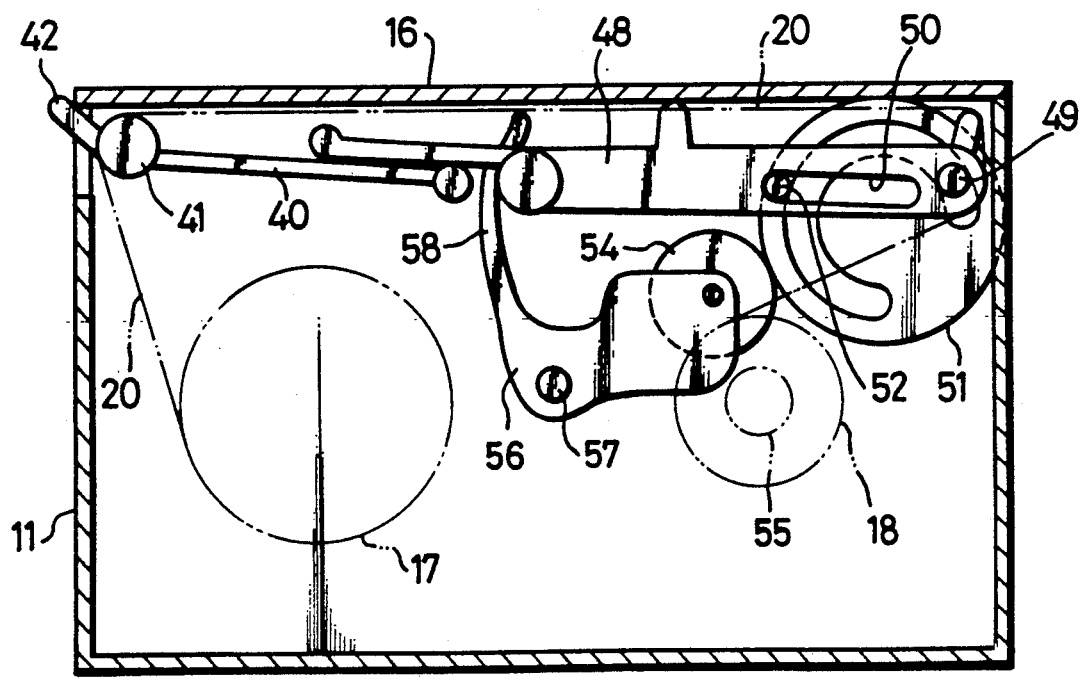
FIG. 6 is a plan view of a small-sized tape cassette, showing the internal structure of the small-sized tape cassette in a partly-exploded state.
Figure 7:
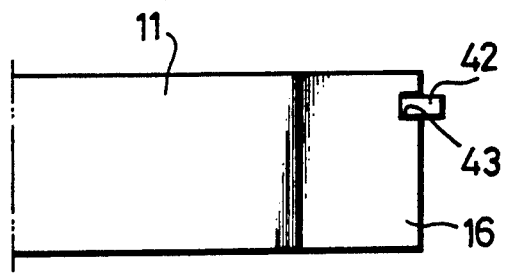
FIG. 7 is a front view of a main portion of the small-sized tape cassette.
Figure 8:
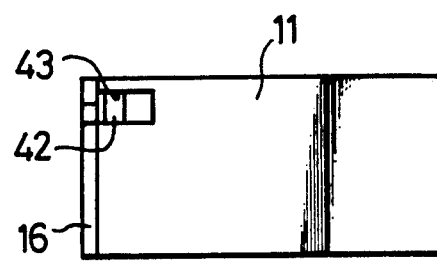
FIG. 8 is a side view of a main component of the small-sized tape cassette.

Referring to FIG. 6, a supply-reel side withdrawing lever 40 is rotatably supported by a pin 41 within the left front portion of tape cassette 11. The outside end of lever 40 forms a protrusion 42, and this protrusion 42 extends into a recess 43 of front lid 16 as shown in FIGS. 7 and 8. When small-sized tape cassette 11 is inserted into adaptor 10, protrusion 42 of lever 40 contacts with a guide portion 44 formed on a side of adaptor 10 to rotate the lever 40 counterclockwise into the position shown in FIG. 9.

Figure 9:
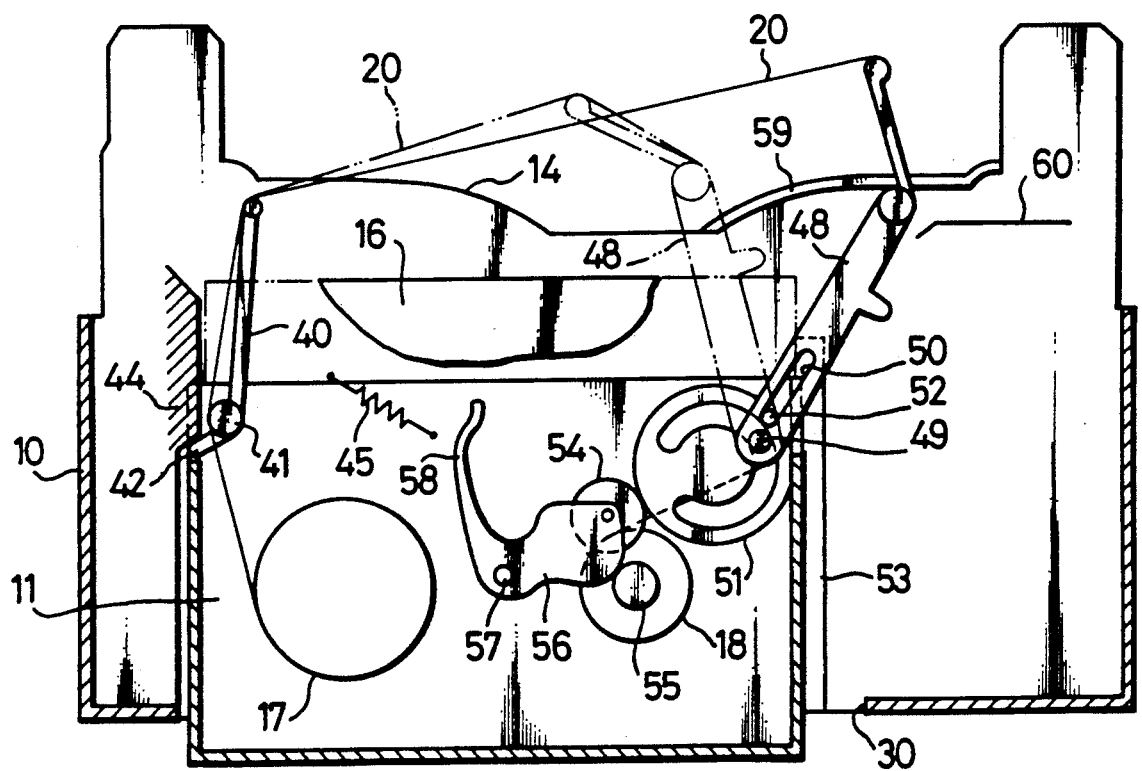
FIG. 9 is a plan view to which reference will be made in explaining the operation of inserting a small-sized tape cassette into the inventive adaptor.
Figure 10:
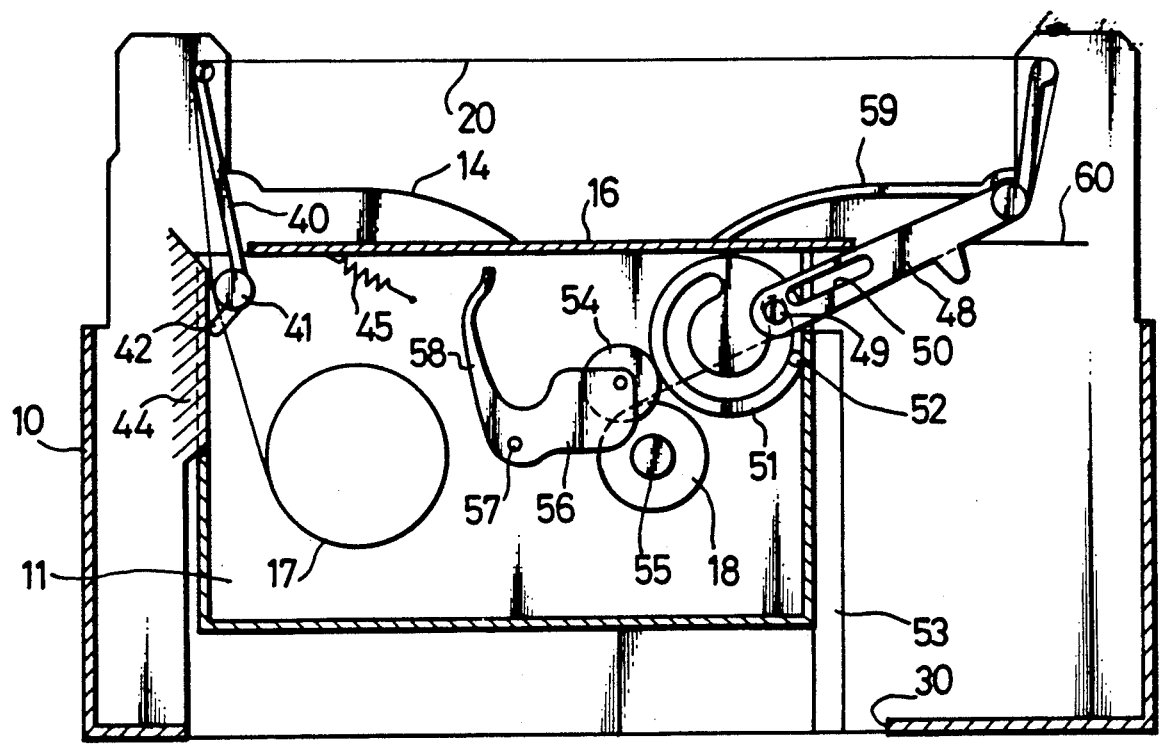
FIG. 10 is a plan view to which reference will be made in explaining the operation in which a magnetic tape is properly extended within an adaptor.

Referring back to FIG. 6, a take-up side withdrawing lever 48 is rotatably supported by a pin 49 opposite lever 40 within small-sized tape cassette 11. Lever 48 has formed therethrough an elongated opening 50, and a pin 52 of a driving gear 51 is engaged into opening 50. As shown in FIGS. 9 and 10, when driving gear 51 meshes with a rack 53 provided on a side of adaptor 10, driving gear 51 is driven to rotate the lever 48. The driving gear 51 also meshes with a pendulum-type gear 54, and the pendulum-type gear 54 meshes with a small gear 55. The pendulum-type gear 54 is rotatably supported to a pendulum-type lever 56. The pendulum-type lever 56 is rotatably supported by a pin 57, and is provided with an arm 58.

Figure 11:
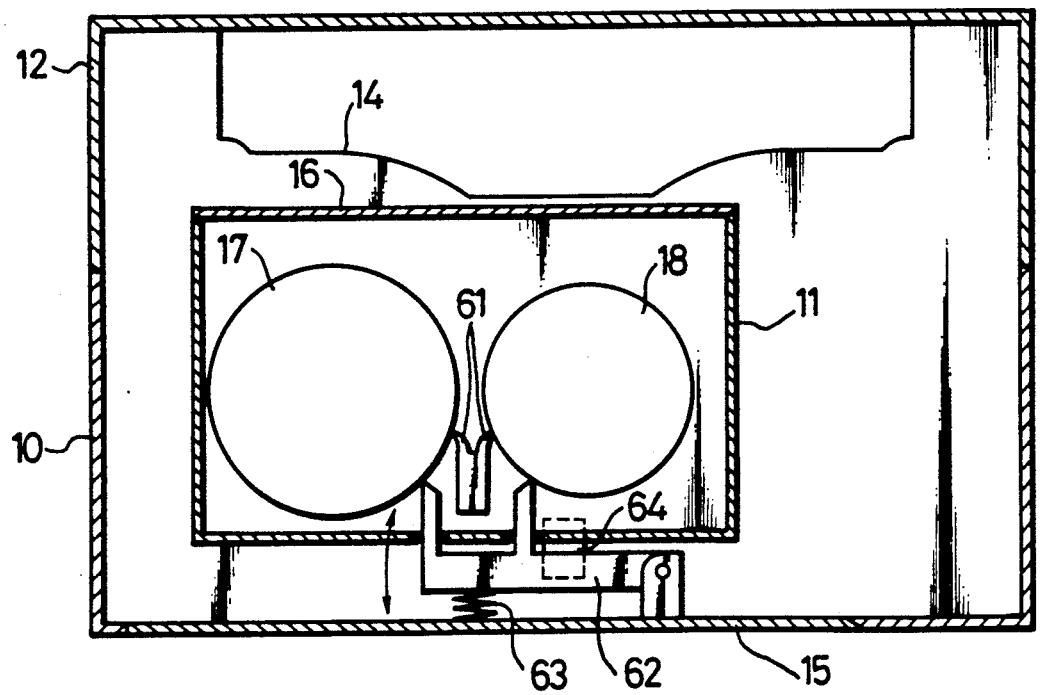
FIG. 11 is a schematic plan view of the inventive adaptor and small-sized tape cassette, to which reference will be made in explaining the operation of releasing a reel brake.

A reel lock lever 61 is provided within small-sized tape cassette 11 as shown in FIG. 11. When small-sized tape cassette 11 is ejected from adaptor 10, this reel lock lever 61 locks the left and right tape reels 17 and 18. Adaptor 10 is provided with a reel lock lever 62, and this reel lock lever 62 is rotatably supported to rear lid 15. Reel lock lever 62 is spring-biased in a locking direction by a spring 63 so that it may lock the pair of tape reels 17 and 18 from the outside of the small-sized tape cassette 11. Adaptor 10 has formed through its bottom an opening 64 to control the locking operation and unlocking operation of reel lock lever 62.

Figure 12:
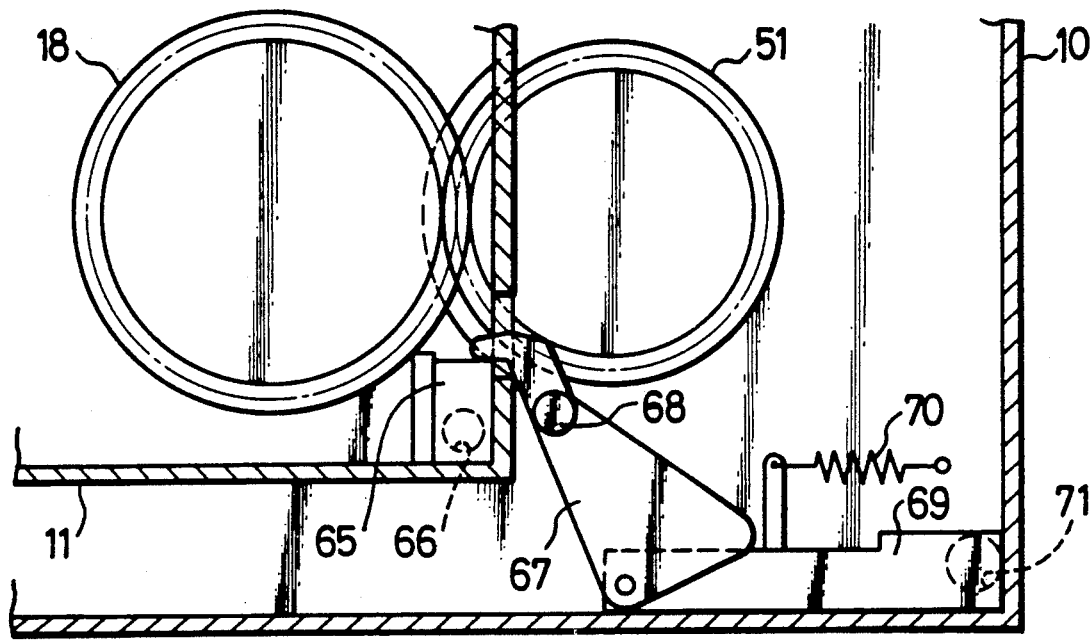
FIG. 12 is a schematic plan view of a mis-erase prevention mechanism of the present invention.
Figure 13:
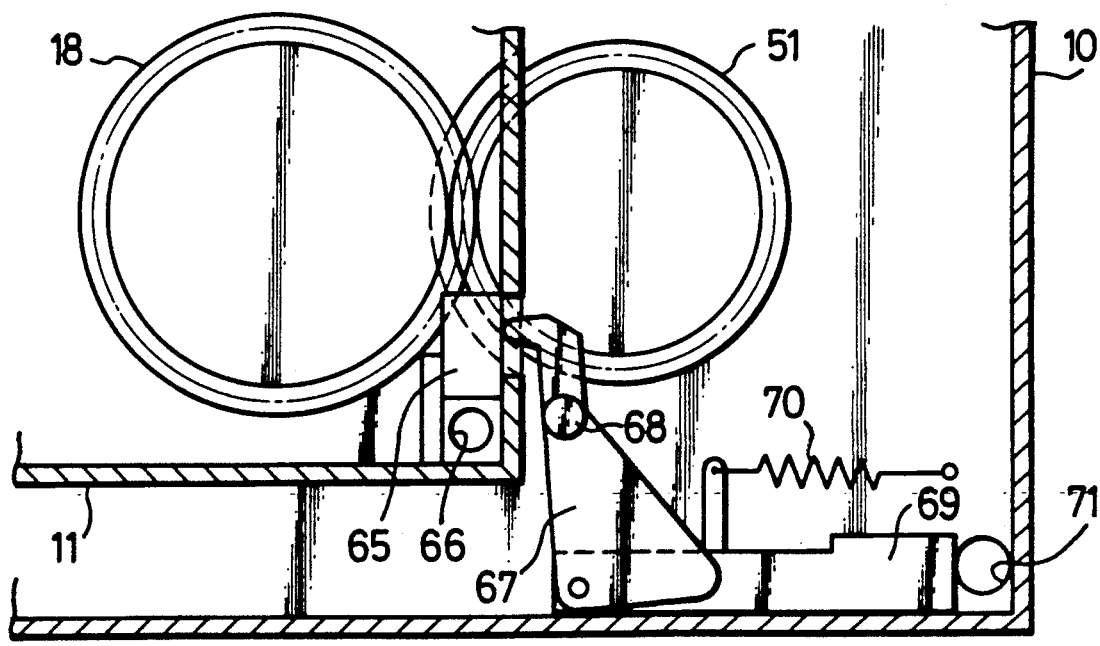
FIG. 13 is a schematic plan view of the FIG. 12 apparatus in another configuration, to which reference will be made in explaining operation of the mis-erase prevention mechanism of FIG. 12.

A slidable member 65 is provided at the corner portion of small-sized tape cassette 11 as shown in FIGS. 12 and 13. A detecting aperture 66 formed through the corner portion of tape cassette 11 is opened and/or closed depending on the location of slidable member 65, and the location of slidable member 65 is detected by a detecting lever 67. Detecting lever 67 is rotatably supported by a pin 68, and this detecting lever 67 is connected to a slidable plate 69. Slidable plate 69 is spring-biased by a spring 70 into its rightward position, closing a detecting aperture 71 in the adaptor 10. Detecting aperture 71 is opened when lever 67 pulls plate 69 toward the left (as shown in FIG. 13).

The operation of adaptor 10 thus made will be described hereinbelow.

When the small-sized tape cassette 11 is to be inserted into adaptor 10 as shown by arrow A in FIG. 1, rear lid 15 of the adaptor 10 is opened. When rear lid 15 is opened as shown in FIGS. 2 through 5, protrusion 26 provided on rear lid 15 moves away from slider 24 and compression coil spring 25 (by its spring force) pushes slider 24 toward the rear (i.e. rightward) in FIG. 4. As slider 24 moves toward the rear, the top of slider 24 pushes the pin 28 of lock lever 22, causing lock lever 22 to move into the position shown in FIG. 4 from the position shown in FIG. 3. Thus, as slider 24 moves toward the rear, front lid 12, which had been locked by lock lever 22, is released to open.

When rear lid 15 is opened as shown in FIG. 2, link 32 coupled to rear lid 15 is moved forward (i.e. rightward in FIG. 5) into the position shown in phantom view in FIG. 5, whereby the top of the link 32 pushes pin 33, causing front lid 12 of adaptor 10 to rotate (in the direction shown by an arrow B in FIG. 5) around supporting pin 27 into its open position (shown in phantom view in FIG. 5).

After rear lid 15 and front lid 12 of adaptor 10 are opened as described above, small-sized tape cassette 11 is inserted into adaptor 10 through rear opening 30. As tape 11 is inserted into adaptor 10, as shown in FIG. 9, driving gear 51 of small-sized tape cassette 11 meshes with rack portion 53 of adaptor 10 so that driving gear 51 rotates in gang with the operation of inserting small-sized tape cassette 11 into adaptor 10. Since driving gear 51 has pin 52 provided thereon and pin 52 is engaged into opening 50 of take-up side withdrawing lever 48, revolution of driving gear 51 is transmitted to lever 48 through pin 52, thus rotating lever 48 around pin 49 in the clockwise direction as shown in FIG. 9.

In this manner, when small-sized tape cassette 11 is inserted into adaptor 10 as described above, withdrawing lever 48 of small-sized tape cassette 11 is rotated. This rotation of lever 48 pushes front lid 16 of small-sized tape cassette 11 forward so that front lid 16 is opened. The other withdrawing lever 40 provided within small-sized tape cassette 11 is rotated when protrusion 42 thereof is pushed by guide portion 44 of adaptor 10, thereby releasing the recess 43 of front lid 16 from being locked by protrusion 42 of lever 40, thus allowing spring 45 to slidably moVe front lid 16 rightwardly by its spring force as shown in FIGS. 9 and 10.

When small-sized tape cassette 11 is inserted into adaptor 10 as described above, guide portion 44 and driving gear 51 rotate the two left and right levers 40 and 48, withdrawing the magnetic tape 20 from small-sized tape cassette 11 as shown in FIG. 9. Although the pin 52 of driving gear 51, engaged with opening 50 of lever 48, is disengaged from opening 50 during the rotation of the lever 48, a guide portion 59 formed on adaptor 10 rotates the withdrawing lever 48 continuously. When small-sized tape cassette 11 has been completely inserted into adaptor 10, withdrawing lever 48 will have been rotated into the predetermined position shown in FIG. 10. When take-up side withdrawing lever 48 has been so rotated, magnetic tape 20 is brought in contact with tape guide 60 and is slightly urged between withdrawing lever 48 and tape guide 60 so that magnetic tape 20, slackened when it is withdrawn, can be properly tensioned between the tape reels 17 and 18.

The other withdrawing lever 40 continues to be pushed and rotated by guide portion 44 as small-sized tape cassette 11 continues to be inserted into adaptor 10, until lever 48 is stopped at the predetermined position shown in FIG. 10. Accordingly, the left and right levers 40 and 48 cause magnetic tape 20, wound around the tape reels 17 and 18, to travel through the front side of the adaptor 10 across the bottom opening 14. By the time the magnetic tape 20 is fully withdrawn, the withdrawing lever 48 has been rotated sufficiently far to allow front lid 16 (spring-biased by spring 45) to close as shown in FIG. 10.

Small-sized tape cassette 11 accommodated within adaptor 10 is provided with reel lock lever 61 as shown in FIG. 11. One portion of reel lock lever 61 projects downwardly through the bottom opening of tape cassette 11 so that, when small-sized tape cassette 11 is inserted into the adaptor 10, reel lock lever 61 is pushed upwardly so as to disengage from teeth portions (not shown) of pair of tape reels 17 and 18, thus releasing the tape reels 17 and 18 from being locked.

Instead of the locking operation by reel lock lever 61, reel lock lever 62 provided on rear lid 15 of adaptor 10 is inserted into small-sized tape cassette 11 from the rearward side to lock the pair of tape reels 17 and 18. When adaptor 10 accommodating small-sized tape cassette 11 is loaded into a video tape recorder, a lock releasing member (not shown) of the video tape recorder is inserted into adaptor 10 through bottom opening 64, thereby moving reel lock lever 62 rearwards against the spring force of spring 63. Thus, tape reels 17 and 18, being locked by reel lock lever 62, are released, and these tape reels 17, 18 are allowed to become freely rotatable.

Adaptor 10 accommodating small-sized tape cassette 11 and having magnetic tape 20 extended along its front side as shown in FIG. 10 is loaded into a video tape recorder designed to utilize tape cassettes of the same size as that of adaptor 10, so that predetermined recording and/or reproduction can be performed. That is, small-sized tape cassette 11, smaller than a standardized tape cassette, can be made compatible with a standardized tape cassette by use of adaptor 10.

As FIG. 12 shows, small-sized tape cassette 11 is provided with detecting aperture 66 which protects magnetic tape 20 from being erased inadvertently. When detecting aperture 66 is closed by slidable member 65, detecting lever 67 detects the closing of detecting aperture 66. More specifically, when slidable member 65 closes detecting aperture 66, detecting lever 67 rotates by a large rotation angle so that its tip enters into the housing of small-sized tape cassette 11, whereby slidable plate 69 coupled to detecting lever 67 is moved toward the right as shown in FIG. 12, thereby closing detecting aperture 71 of the adaptor 10. Similarly to the format of a standard tape cassette, detecting means on a video tape recorder detects slidable plate 69 which closes detecting aperture 71, thus making it possible to set the video tape recorder in the recording mode.

When on the other hand detecting aperture 66 of tape cassette 11 is not closed by slidable member 65, or when detecting aperture 66 remains opened as shown in FIG. 13, detecting lever 67 comes in contact with the slidable member 65 so that detecting lever 67 is prevented from entering small-sized tape cassette 11. In this case, slidable plate 69 is moved leftward against the spring force of spring 70, whereby slidable plate 69 is prevented from closing detecting aperture 71. In this event, the detecting means on the video tape recorder detects the opened detecting aperture 71, thereby preventing the video tape recorder from being switched to the recording mode. In this fashion, a signal, recorded on magnetic tape 20 accommodated within small-sized tape cassette 11, can be prevented from being erased unintentionally.

Detecting lever 67 of adaptor 10 is operated in gang with rear lid 15 so that, when rear lid 15 is opened, or when small-sized tape cassette 11 is inserted into adaptor 10, detecting lever 67 is rotated in the clockwise direction into the position shown in FIG. 13, thus allowing small-sized tape cassette 11 to enter adaptor 10.

At the completion of recording and/or reproduction of magnetic tape 20 accommodated within small-sized tape cassette 11, adaptor 10 accommodating tape cassette 11 is ejected from the video tape recorder. Thereafter, small-sized tape cassette 11 is removed from adaptor 10 in the opposite manner. The operation in which small-sized tape cassette 11 is removed or ejected from adaptor 10 is just opposite to the above-noted operation of inserting the cassette into the adaptor. The ejection operation for removing tape cassette 11 from adaptor 10 will be explained more fully below. When small-sized tape cassette 11 is removed from adaptor 10, rack 53 rotates driving gear 51 in the opposite direction to that in which it rotates upon insertion. Rotation of driving gear 51 is transmitted to withdrawing lever 48 through pin 52 and opening 50, whereby lever 48 is rotated around pin 49 in the counter-clockwise direction in FIG. 10 so as to be accommodated within small-sized tape cassette 11. The rotation of driving gear 51 in the reverse direction is transmitted through pendulum-type gear 54 to small gear 55, thereby rotating take-up side tape reel 18 in the tape winding direction. Thus, magnetic tape 20, slackened by the rotation of the lever 48, is wound by the tape reel 18.

Just before take-up side withdrawing lever 48 is rotated in substantially the opposite direction from that in which it rotates during insertion of cassette 11 into adaptor 10, so that it is accommodated within small-sized tape cassette 11, lever 48 pushes arm 58 of pendulum-type lever 56 which supports pendulum-type gear 54, whereby pendulum-type gear 54 is disengaged from small gear 55 provided on the tape reel 18.

When small-sized tape cassette 11 is removed from adaptor 10, the protrusion 42 of the other withdrawing lever 40 is released from guide portion 44 of adaptor 10 in gang with the above-noted removal of tape cassette 11, whereby the other withdrawing lever 40 is rotated around pin 41 in the clockwise direction in FIGS. 9 and 10 and is accommodated within the housing of small-sized tape cassette 11.

When small-sized tape cassette 11 is removed from adaptor 10, take-up side withdrawing lever 48 is rotated in the counter-clockwise direction in gang with the above removal and is accommodated within tape cassette 11, thereby allowing front lid 16 of small-sized tape cassette 11 to be opened temporarily. Then, front lid 16 is moved toward the right in FIG. 9 by guide portion 44 of adaptor 10. When lever 48 has fully entered into small-sized tape cassette 11, front lid 16 again closes. At this time, protrusion 42 of withdrawing lever 40 engages with recess 43 of front lid 16, thus locking front lid 16 in its closed state.

In adaptor 10 for a small-sized tape cassette, magnetic tape 20 is extended along the inside surface of front lid 16 in gang with the operation in which small-sized tape cassette 11 is inserted into adaptor 10. Thus, magnetic tape 20 can be extended without using a motor or a battery unlike the prior art, which provides a light-weight and miniaturized adaptor for a small-sized tape cassette. Further, the adaptor of the present invention utilizes neither a motor nor the battery, which provides an inexpensive adaptor. Furthermore, since the adaptor of the present invention eliminates the problems arising from dead batteries in prior art adaptors, the adaptor of the present invention can be utilized in all places. In addition, the adaptor of the invention is not bound to the speed of a motor so that the adaptor can readily load the small-sized tape cassette.

In small-sized tape cassette 11 accommodated within adaptor 10, after magnetic tape 20 is withdrawn by pair of levers 40 and 48, front lid 16 is closed as shown in FIG. 10 so that, when recording and/or reproduction is performed by using adaptor 10, front lid 16 is in its closed state. Thus, front lid 16 can be prevented from overlapping the inside of the upper plate of adaptor 10, thus making it possible to reduce the size of magnetic tape 20 with respect to its widthwise direction. Alternatively, it becomes possible to improve a space factor, of a space of the video tape recorder in which the head drum of the video tape recorder is received, with respect to its height direction. Therefore, the head drum and the front lid can be prevented from interfering with each other.

Having described a preferred embodiment of the present invention in detail with reference to the accompanying drawings, it is to be understood that the present invention is not limited to that precise embodiment and that many changes and modifications could be effected by one skilled in the art without departing from the spirit and scope of the invention as defined in the appended claims.

We claim as out invention:

1. A tape cassette adaptor system, in which a small-sized tape cassette smaller than a standardized tape cassette is accommodated in an adaptor whose size is the same as that of the standardized tape cassette, for enabling the small-sized tape cassette to be loaded onto a recording and/or reproducing apparatus utilizing the standardized tape cassette, wherein the small-sized tape cassette houses a magnetic tape, said tape cassette adaptor system comprising:
   (a) a set of tap withdrawing levers mounted within the small-sized tape cassette for withdrawing the magnetic tape; and
   (b) a guide means mounted within the adaptor outside the small-sized tape cassette for rotating the tape withdrawing levers, wherein said guide means is mounted in such a position that the guide means engages and rotates the tape withdrawing levers upon insertion of the small-sized tape cassette into the adaptor.

2. A tape cassette adaptor system, in which a small-sized tape cassette smaller than a standardized tape cassette is accommodated in an adaptor whose size is the same as that of the standardized tape cassette, for enabling the small-sized tape cassette to be loaded onto a recording and/or reproducing apparatus utilizing the standardized tape cassette, wherein the small-sized tape cassette houses a magnetic tape, and comprising:
   (a) a set of tape withdrawing levers within the small-sized tape cassette for withdrawing the magnetic tape; and
   (b) a rotating means mounted within the adaptor for rotating said tape withdrawing levers, wherein said rotating means is mounted in such a position that the tape withdrawing levers are rotated by said rotating means upon insertion of the small-sized tape cassette into the adaptor, and
   wherein the small-sized cassette also includes a front lid and a means for biasing the front lid into a closed position, wherein the tape withdrawing levers act against the front lid as they rotate during insertion of the small-sized cassette into the adaptor so as to open the front lid temporarily and thus allow withdrawal of the tape from within the small-sized cassette, and wherein the tape withdrawing levers act against the front lid as they rotate during removal of the small-sized cassette from the adaptor so as to open the front lid temporarily and thus allow retraction of the tape into the small-sized cassette.

3. The system of claim 2, wherein each tape withdrawing lever in said set rotates along a path, and wherein the tape withdrawing levers act against the front lid, so as to open the front lid temporarily, as each of said levers rotates through a first portion of its path.

4. A tape cassette adaptor system, in which a small-sized tape cassette smaller than a standardized tape cassette is accommodated in an adaptor whose size is the same as that of the standardized tape cassette, for enabling the small-sized tape cassette to be loaded onto a recording and/or reproducing apparatus utilizing the standardized tape cassette, wherein the small-sized tape cassette houses a magnetic tape, and comprising:
(a) a set of tape withdrawing levers within the small-sized tape cassette for withdrawing the magnetic tape; and
(b) a rotating means mounted within the adaptor for rotating said tape withdrawing levers, wherein said rotating means is mounted in such a position that the tape withdrawing levers are rotated by said rotating means upon insertion of the small-sized tape cassette into the adaptor, and wherein the adaptor also includes:
a front adaptor lid;
a rear adaptor lid rotatably mounted so as to be capable of rotating into an open position enabling insertion of the small-sized cassette into the adaptor;
a spring-biased lock lever attached to the front adaptor lid for biasing the front adaptor lid into a closed position; and
spring-biased lock release means coupled between the lock lever and the rear adaptor lid for automatically releasing the lock lever upon the opening of the rear adaptor lid.

5. The system of claim 4, wherein the spring-biased lock lever includes a pivoting lever and a spring connected between the pivoting lever and the adaptor, and wherein the spring-biased lock release means includes a spring-biased slider element, wherein the slider element is slidably attached to the adaptor in a position so that, upon the opening of the rear adaptor lid, the slider element will automatically slide into engagement with the pivoting lever and cause the pivoting lever to rotate so as to release the front adaptor lid.

6. The system of claim 4, also including:
a pin attached to the adaptor, wherein the rear adaptor lid is rotatably connected to the pin; and
a link member connected between the rear adaptor lid and the front adaptor lid, wherein upon rotation of the rear adaptor lid about the pin, the link member will exert a force on the front adaptor lid urging the front adaptor lid into an open position.

7. A tape cassette adaptor system, in which a small-sized tape cassette smaller than a standardized tape cassette is accommodated in an adaptor whose size is the same as that of the standardized tape cassette, for enabling the small-sized tape cassette to be loaded onto a recording and/or reproducing apparatus utilizing the standardized tape cassette, wherein the small-sized tape cassette houses a magnetic tape, and comprising:
(a) a set of tape withdrawing levers within the small-sized tape cassette for withdrawing the magnetic tape; and
(b) a rotating means mounted within the adaptor for rotating said tape withdrawing levers, wherein said rotating means is mounted in such a position that the tape withdrawing levers are rotated by said rotating means upon insertion of the small-sized tape cassette into the adaptor, wherein the small-sized cassette includes a supply reel and a take-up reel, wherein the set of tape withdrawing levers includes a supply reel lever and a take-up reel lever, and wherein the small-sized cassette also includes a driving gear, positioned for engaging a rack portion of the adaptor and coupled to the take-up reel lever, wherein upon insertion of the small-sized cassette into the adaptor the action of the rack portion on the driving gear rotates the driving gear in a first direction, and the rotation of the driving gear in the first direction in turn rotates the take-up reel lever in a tape withdrawing direction.

8. The system of claim 7, wherein the small-sized cassette also includes:
a pendulum-type gear meshing with the driving gear; and
a small gear meshing with the pendulum-type gear and coupled to the take-up reel, wherein upon removal of the small-sized cassette from the adaptor the action of the rack portion on the driving gear rotates the driving gear in a second direction opposite the first direction, wherein rotation of the driving gear in the second direction rotates the take-up reel lever in a tape retracting direction opposite to the tape withdrawing direction, and wherein rotation of the driving gear in the second direction also causes the pendulum-type gear to drive the small gear in a direction causing the take-up reel to wind the magnetic tape onto said take-up reel.

9. The system of claim 8, wherein rotation of the driving gear in the second direction causes the pendulum-type gear to disengage momentarily from the small gear, and thereafter to reengage with the small gear and rotate the small gear in said direction causing the take-up reel to wind the magnetic tape onto said take-up reel.

10. An adaptor for accommodating a small-sized tape cassette having size smaller than a standardized tape cassette, to enable the small-sized tape cassette to be loaded onto a recording and/or reproducing apparatus utilizing the standardized tape cassette, wherein the small-sized tape cassette houses a magnetic tape, and wherein a set of tape withdrawing levers are mounted within the small-sized tape cassette for withdrawing the magnetic tape, said adaptor comprising:
an adaptor housing sized the same as said standardized tape cassette; and
a lever rotating means mounted in the adaptor housing in such a position as to engage and rotate the tape withdrawing levers in a tape withdrawing direction upon insertion of the small-sized tape cassette into the adaptor housing.

11. The adaptor of claim 10, wherein the lever rotating means is mounted in such a position as to engage and rotate the tape withdrawing levers in a tape retracting direction opposite the tape withdrawing direction upon removal of the small-sized tape cassette from the adaptor housing.

12. An adaptor for accommodating a small-sized tape cassette having size smaller than a standardized tape cassette, to enable the small-sized tape cassette to be loaded onto a recording and/or reproducing apparatus utilizing the standardized tape cassette, wherein the small-sized tape cassette houses a magnetic tape, and wherein a set of tape withdrawing levers are mounted within the small-sized tape cassette for withdrawing the magnetic tape, said adaptor comprising:
an adaptor housing sized the same as said standardized tape cassette;
a lever rotating means mounted in the adaptor housing in such a position as to rotate the tape withdrawing levers in a tape withdrawing direction upon insertion of the small-sized tape cassette into the adaptor housing;

a front adaptor lid;

a rear adaptor lid rotatably mounted so as to be capable of rotating into an open position enabling insertion of the small-sized cassette into the adaptor housing;

a spring-biased lock lever attached tot he front adaptor lid for biasing the front adaptor lid into a closed position; and spring-biased lock release means coupled between the lock lever and the rear adaptor lid for automatically releasing the lock lever upon the opening of the rear adaptor lid.

13. The adaptor of claim 12, wherein the spring-biased lock lever includes a pivoting lever and a spring connected between the pivoting lever and the adaptor housing, and wherein the spring-biased lock release means includes a spring-biased slider element, wherein the slider element is slidably attached to the adaptor housing in a position so that, upon the opening of the rear adaptor lid, the slider element will automatically slide into engagement with the pivoting lever and cause the pivoting lever to rotate so as to release the front adaptor lid.

14. The adaptor of claim 12, also including:

a pin attached to the adaptor housing, wherein the rear adaptor lid is rotatably connected to the pin; and a link member connected between the rear adaptor lid and the front adaptor lid, wherein upon rotation of the rear adaptor lid about the pin, the link member will exert a force on the front adaptor lid urging the front adaptor lid into an open position.

15. An adaptor for accommodating a small-sized tape cassette having size smaller than a standardized tape cassette, to enable the small-sized tape cassette to be loaded onto a recording and/or reproducing apparatus utilizing the standardized tape cassette, wherein the small-sized tape cassette houses a magnetic tape, and wherein a set of tape withdrawing levers are mounted within the small-sized tape cassette for withdrawing the magnetic tape, said adaptor comprising:

an adaptor housing sized the same as said standardized tape cassette; and a lever rotating means mounted in the adaptor housing in such a position as to rotate the tape withdrawing levers in a tape withdrawing direction upon insertion of the small-sized tape cassette into the adaptor housing, wherein the lever rotating means is a rack portion of the adaptor housing, wherein the small-sized cassette includes a supply reel and a take-up reel, wherein the set of tape withdrawing levers includes a supply reel lever and a take-up reel lever, and wherein the small-sized cassette also includes a driving gear, positioned for engaging the rack portion of the adaptor housing and coupled to the take-up reel lever, wherein upon insertion of the small-sized cassette into the adaptor housing the action of the rack portion on the driving gear rotates the driving gear in a first direction, and the rotation of the driving gear in the first direction in turn rotates the take-up reel lever in a tape withdrawing direction.

16. The adaptor of claim 15, wherein the small-sized cassette also includes a pendulum-type gear meshing with the driving gear and a small gear meshing with the pendulum-type gear and coupled to the take-up reel, wherein upon removal of the small-sized cassette from the adaptor the action of the rack portion on the driving gear rotates the driving gear in a second direction opposite the first direction, wherein rotation of the driving gear in the second direction rotates the take-up reel lever in a tape retracting direction opposite to the tape withdrawing direction, and wherein rotation of the driving gear in the second direction also causes the pendulum-type gear to drive the small gear in a direction causing the take-up reel to wind the magnetic tape onto said take-up reel.

17. A small-sized tape cassette, having a size smaller than a standardized tape cassette, and sized for insertion within an adaptor whose size is the same as that of the standardized tape cassette, so that the small-sized tape cassette may be loaded onto a recording and/or reproducing apparatus utilizing the standardized tape cassette, including:

a housing;

a magnetic tape within the housing;

a set of tape withdrawing levers for withdrawing the magnetic tape from within the housing upon insertion of the small-sized tape cassette into the adaptor, in response to action of a rotating means mounted within the adaptor;

a front lid attached to the housing; and a means for biasing the front lid into a closed position, wherein the tape withdrawing levers are positioned so as to act against the front lid as they rotate during insertion of the small-sized cassette into the adaptor so as to open the front lid temporarily and thus allow withdrawal of the tape from within the housing, and wherein the tape withdrawing levers are positioned so as to act against the front lid as they rotate during removal of the small-sized cassette from the adaptor so as to open the front lid temporarily and thus allow retraction of the tape into the housing.

18. The cassette of claim 17, wherein each tape withdrawing lever in said set rotates along a path, and wherein the tape withdrawing levers act against the front lid, so as to open the front lid temporarily, as each of said levers rotates through a first portion of its path.

19. The cassette of claim 17, wherein the set of tape withdrawing levers includes a supply reel lever and take-up reel lever, and also including:

a supply reel and a take-up reel mounted within the housing; and a driving gear, positioned for engaging a rack portion of the adaptor and coupled to the take-up reel lever, wherein upon insertion of the small-sized cassette into the adaptor the action of the rack portion on the driving gear rotates the driving gear in a first direction, and the rotation of the driving gear in the first direction in turn rotates the take-up reel lever in a tape withdrawing direction.

20. The cassette of claim 19, also including:

a pendulum-type gear meshing with the driving gear; and a small gear meshing with the pendulum-type gear and coupled to the take-up reel, wherein upon removal of the small-sized cassette from the adaptor the action of the rack portion on the driving gear rotates the driving gear in a second direction opposite the first direction, wherein rotation of the driving gear in the second direction rotates the take-up reel lever in a tape retracting direction opposite to the tape withdrawing direction, and wherein rotation of the driving gear in the second direction also causes the pendulum-type gear to drive the small gear in a direction causing the take-up reel to wind the magnetic tape onto said take-up reel.

21. The cassette of claim 20, wherein rotation of the driving gear in the second direction causes the pendulum-type gear to engage with the small gear and rotate the small gear in said direction causing the take-up reel to wind the magnetic tape onto said take-up reel, and thereafter said pendulum-type gear is pushed by the tape withdrawing lever so as to disengage from the small gear.

* * * * *